April 28, 1936.　　　D. P. GHADIALI　　　2,038,784
COLOR WAVE PROJECTION APPARATUS
Filed Sept. 15, 1934　　　3 Sheets-Sheet 1
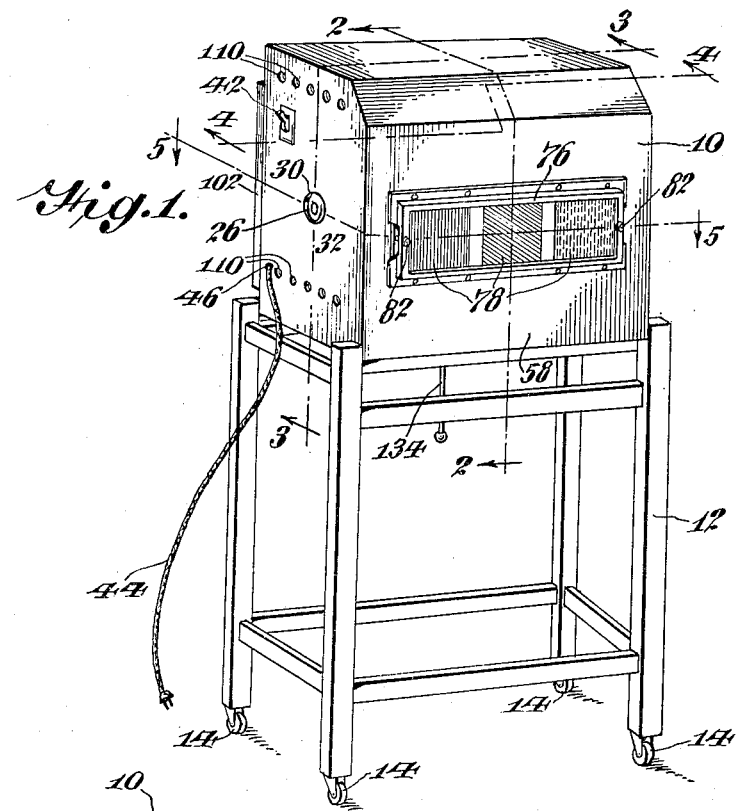
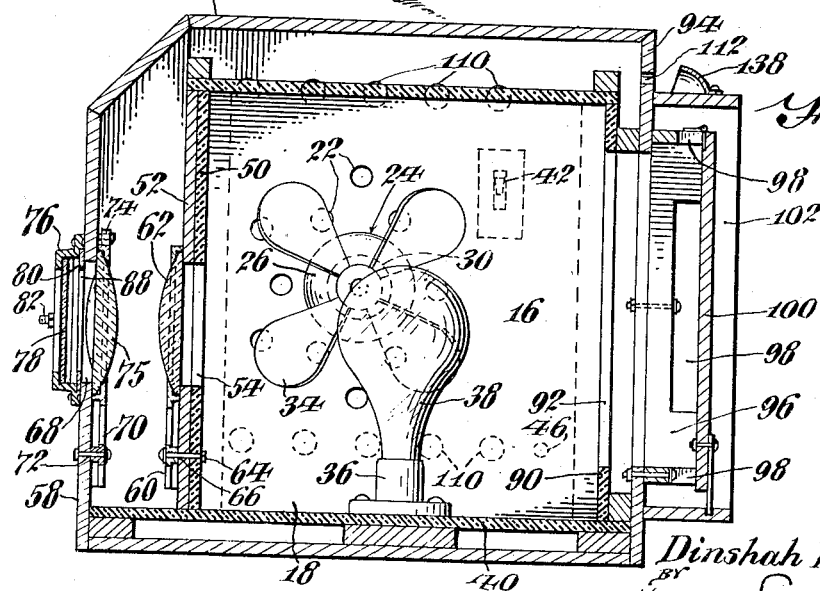
INVENTOR.
Dinshah P. Ghadiali
BY Harry Langsam
ATTORNEY.

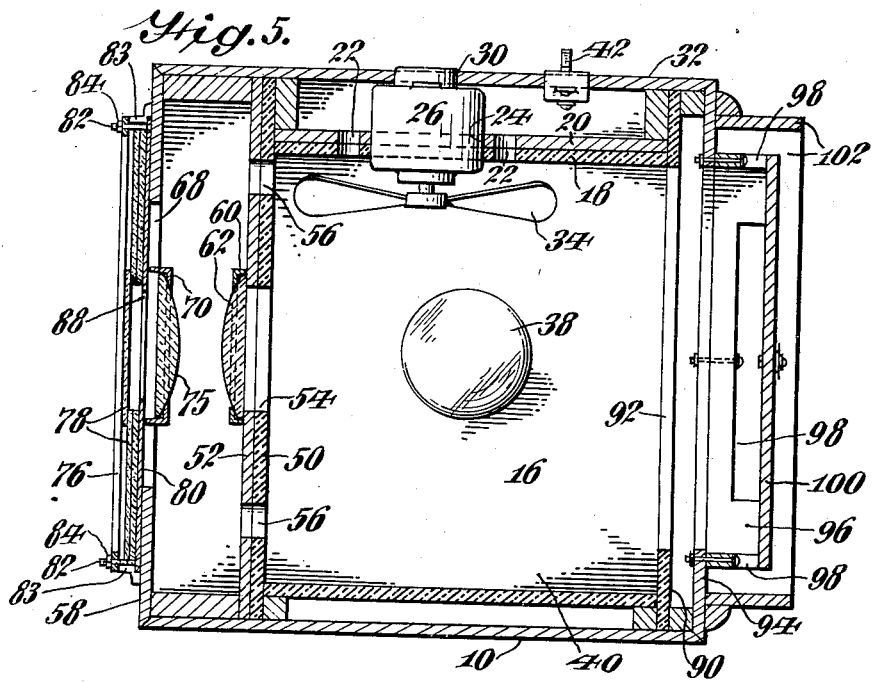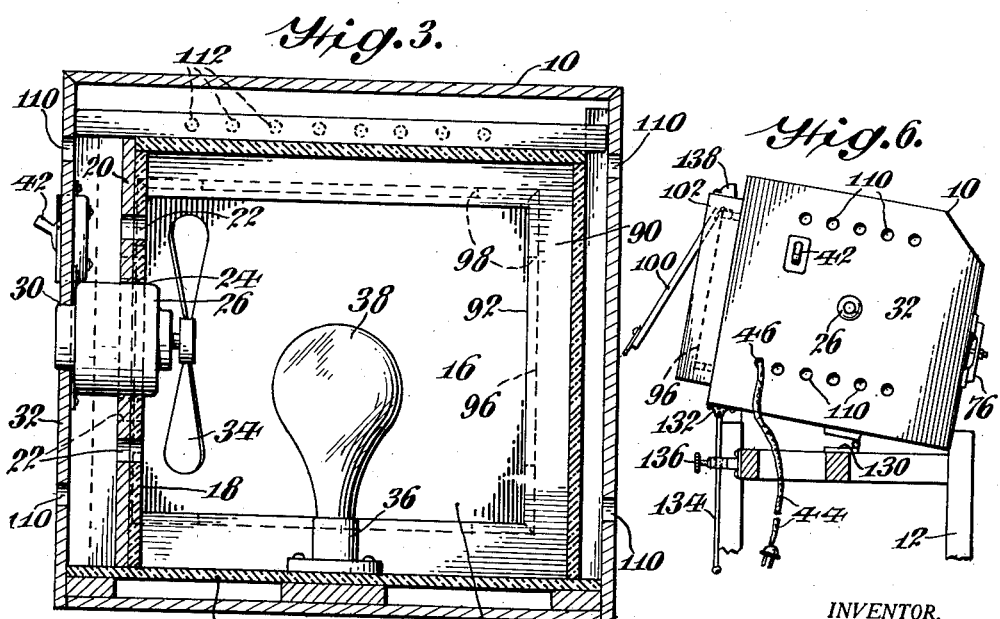

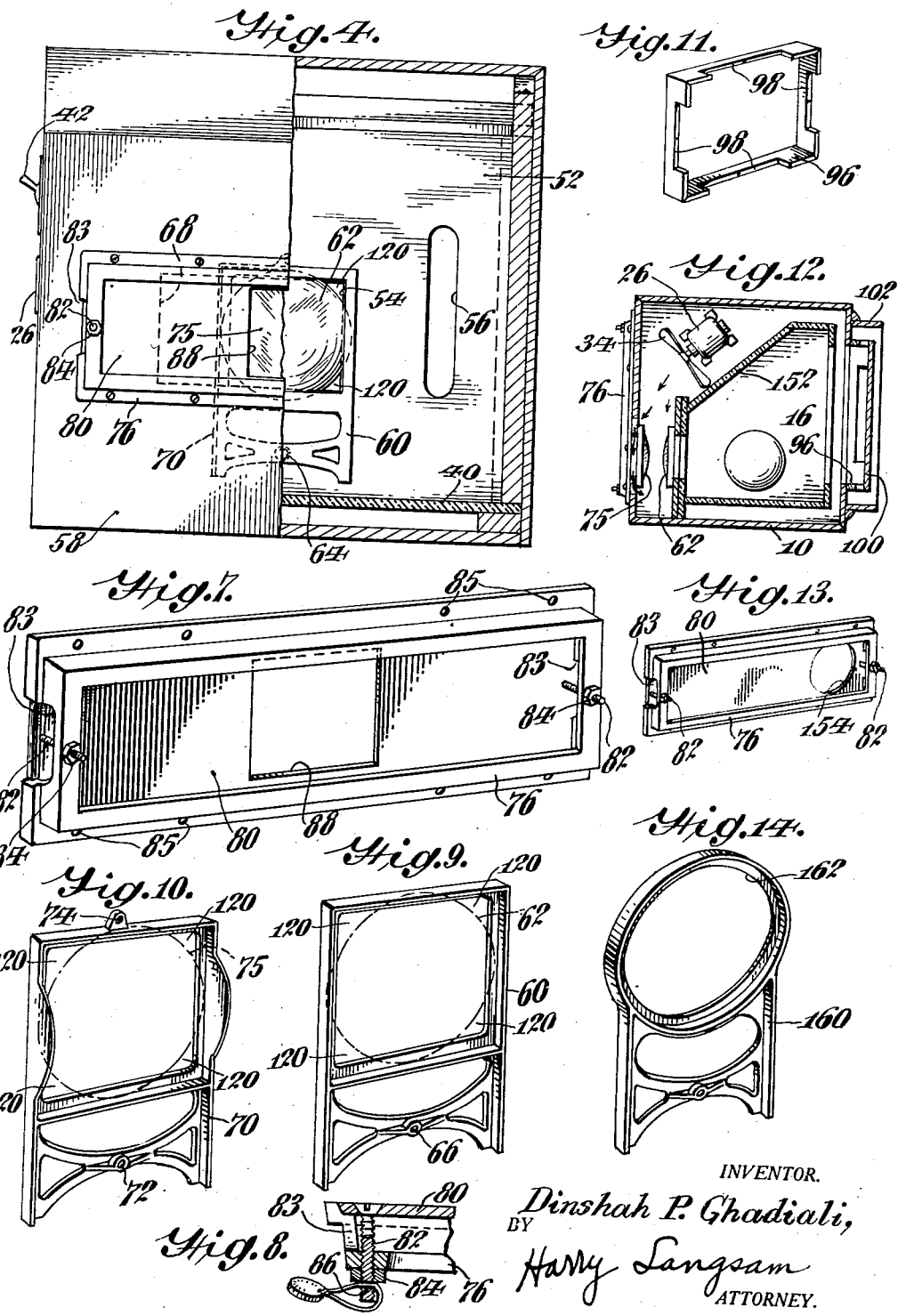

Patented Apr. 28, 1936

2,038,784

UNITED STATES PATENT OFFICE 2,038,784

COLOR WAVE PROJECTION APPARATUS

Dinshah P. Ghadiali, Malaga, N. J.

Application September 15, 1934, Serial No. 744,138

8 Claims. (Cl. 240—1)

My invention relates to color wave projection and more particularly, relates to color wave projection apparatus intended primarily for use in the treatment of diseases by means of color waves emanating from selected portions of the spectrum.

Heretofore, effective color wave projection apparatus has been limited to expensive metal cabinets provided with complicated ventilating means, and elaborate color wave slide carriers.

The primary object of my invention is to provide an effective color wave projection apparatus which is simple, durable, inexpensive, and easily operable.

Another object of my invention is to provide a color wave projector in a wood cabinet.

Still another object of my invention is to produce a color wave projection cabinet having a simplified self-contained ventilating system.

A further object of my invention is to provide a color wave projection cabinet having a condensing lens system which is ventilated in a manner to prevent unequal temperature strains in the lenses.

Still a further object of my invention is to provide a color wave projection cabinet in which the color wave slides are ventilated to prevent unequal temperature strains.

Another object of my invention is to produce a color wave slide carrier which is capable of being sealed to detect tampering with the color wave slides by unauthorized persons.

With these and other objects in view, which will become apparent as the description proceeds, my invention embodies a double walled light-proof cabinet containing a high-intensity source of white light, an air-circulating fan and interconnecting ventilating louvres, a through aperture for radiant emission provided with a condensing lens system and cooperable and/or interchangeable color wave slides, and means for directing the color waves and controlling the fan and radiant light source.

My invention, both as to details of construction and combination of parts, will best be understood from the following description of specific embodiments when read in connection with the accompanying drawings, in which:

Fig. 1 is a perspective view of my color wave projector;

Fig. 2 is a section on the line 2—2 of Fig. 1;

Fig. 3 is a section on the line 3—3 of Fig. 1;

Fig. 4 is a section on the line 4—4 of Fig. 1;

Fig. 5 is a section on the line 5—5 of Fig. 1;

Fig. 6 is a side elevational view of the projector showing the adjustable bracket clamp which enables the projector to be tilted from the horizontal;

Fig. 7 is a perspective view of the color wave slide carrier;

Fig. 8 is a fragmentary view, partly in section showing one of the screws securing the color wave slide carrier to its back plate;

Fig. 9 is a perspective view of the rear condensing lens frame;

Fig. 10 is a perspective view of the front condensing lens frame;

Fig. 11 is a perspective view of the posterior internal louvred light baffle;

Fig. 12 is a sectional plan view of a modification of my color wave projector with lenses, fan, lamp, and slide carrier not in section;

Fig. 13 is a perspective view of the slide wave carrier of Fig. 12; and

Fig. 14 is a perspective view of a modification of my condensing lens frame.

Referring to the drawings, I have shown in Fig. 1 a cabinet 10 mounted on a stand 12, which is adapted to roll on swivel casters 14. The cabinet 10 is composed of an external shell of plywood or other material and an internal compartment 16 lined interiorly with plasterboard or other heat resisting and heat insulating material and separated by air spaces from the outer shell. The plasterboard partition 18 to one side of compartment 16 is reinforced by a layer 20 of wood, and both walls 18 and 20 are pierced by a number of small apertures 22 surrounding a large aperture 24, see Fig. 5. An electric fan motor 26 whose central part is of approximately the same diameter as the aperture 24 and the fan motor is securely held between aperture 24 and a smaller aperture 30 in the external wall 32 on the same side of the cabinet 10, without any need for a base for said fan, the walls 18 and 20 being finally secured when the fan motor is in place. The apertures 22 are so located that the fan blades 34 impel air forcefully therethrough. A receptacle 36, see Figs. 2 and 3, for an incandescent lamp 38 is situated on the floor 40 of the compartment 16. An electric supply cord 44 enters the cabinet through a small aperture 46, Fig. 6, and, by means of a switch 42, externally operable, simultaneously controls the fan motor 26 and incandescent lamp 38 which are in electrical multiple (electric connections not illustrated).

The front plasterboard partition 50, see Fig. 5, is also re-inforced externally by a partition 52 and both walls 50 and 52 are pierced by a central square aperture 54 and by two vertically elongated openings 56, one to each side of the center. In the space between the wall 52 and the front outside wall 58, a rear condensing lens frame 60 of metal or other material bearing a condensing lens 62 is secured to the wall 52 by means of a screw 64 in screw hole 56. The external wall 58 is pierced by a rectangular aperture 68 coaxial with aperture 54 and of the same height, but being considerably wider. The central portion of the aperture 68 is covered internally by the condensing lens frame 70, see Figs. 2, 5, and 10, secured to the front wall 58 by means of screws in screw holes 72 and 74 and bearing condensing lens 75.

Completely covering the external face of the aperture 68 and extending laterally beyond it is a metal color wave slide carrier 76, containing five color wave slides 78, and having a metal rear plate 80 secured to the carrier 76 by screws 82, one at each end, said screws having their heads retained in the plate 80 and secured at the threaded end by nuts 84, and being provided with a hole 86 in the screw-threaded portion external to the nut for the reception of a wire and a seal. A slot 83 is provided at each end of carrier 76, which permits insertion of the fingers of the operator to move the color wave slides. The carrier 76 is attached to the cabinet 10 by means of screws in screw holes 85 around the periphery of said carrier 76. The rear plate 80 is provided with a square aperture 88 which is coaxial with apertures 54 and 68.

The rear wall 90 of compartment 16 is provided with a large opening 92, see Figs. 2, 3, and 5. The external rear wall 94 has a corresponding opening which is surrounded externally by a light baffle 96 having louvres 98 and closed by a hinged cover flap 100. Surrounding the baffle 96 is a light guard 102. The system of baffle, guard, and cover flap permits access to compartment 16 for replacement of lamp 38, permits free circulation of air for cooling the lamp, and prevents undesirable light leakage rearwardly of the lamp. A horizontal row of perforations 110 near the top and the bottom in both external side walls, and perforations 112 at the top of the wall 94 permit access of cool air from outside the cabinet, and, also, the escape of the heated air from the inside of the cabinet.

The cooling system operates as follows: On closing switch 42 both the lamp and fan are energized. The fan draws air through apertures 22 and forces it against lamp 38 where it cools the lamp and becomes heated. The heated air is then further forced preponderantly to the rear and out through aperture 92 and louvres 98 in baffle 96. Some of the heated air, however, is blown into aperture 54 and escapes into the space between walls 52 and 58 through the openings 120 between the square aperture in the lens frame 60 and the disc lens 62. This flow of heated air over the lens serves to heat both surfaces equally, and hence prevents cracking due to unequal thermal stresses. Part of the heated air then flows forward and similarly around the front condensing lens 75, and the remainder flows up and into the top air space over compartment 16 where it mixes with cool air coming in through perforations 110 and 112 in response to suction created in the space between compartment 16 and the outer shell by operation of the fan. The air which flows over lens 75 serves uniformly to warm the color wave slides and prevent breakage by concentration of heat. The color wave slides not being used are also kept uniformly heated by reason of the flow of warm air over rear plate 80 via the laterally widened aperture 68.

The cabinet 10, see Figs. 1 and 6, is tiltable by means of hinges 130 secured to a middle portion of the bottom of the cabinet and to a cross-member of the stand 12. To the rearward portion of the bottom of cabinet 10 is secured an adjustable bracket clamp consisting of a clamp member 132 secured to said cabinet to which is swiveled a downwardly projecting rod member 134 which passes through a clamp member 136 secured to another cross-member of stand 12. A handle 138 provides a grip for tilting the projector.

The modification of Fig. 12 differs from the above-described device in three particulars, hence these are the only parts described. In place of the fan 26, and its blade 34, located in the side walls, the compartment 16 instead of being square in plan view, has a forward corner cut off from said compartment by a partition 152 of the aforesaid heat insulating and resistant material. Secondly, the lamp and lens system of the modification of Fig. 12 are moved to the side of the center opposite the fan. Finally, the slide carrier, which is located symmetrically with respect to the cabinet 10 has its rear plate opening 154 at one end instead of centrally and is round instead of square as at 88. In this modification, the cooling air from the fan blows on the back of the color slides and flows fast through suitable vents located beneath the rear condenser into the bulb chamber 16, and then the heated air exhausts through suitable louvres to the outside air.

Fig. 14 shows a modified lens frame 160 which may be used in place of the square frames 60 and 70. This frame is provided with a circular aperture 162 instead of a square aperture. In this case it is advisable to use a circular aperture so that uniform heating of both lens surfaces may take place.

Although specific materials have been described, above, any other material of suitable characteristics may be employed, for example, wood, synthetic resins, and metals may be used in place of the plywood mentioned above; asbestos, gypsum or other non-combustible thermal insulators may be used in place of the plasterboard. Where apertures or perforations have been described as being round or square, or have not been specified as to shape, any other shape such as polygonal, oval, etc. may be employed. Although five color wave slides have been described, any number of any desired wave length or combinations thereof may be used. However, I prefer to use the following colors, corresponding to the following wave lengths in angstrom units:

| | Angstrom units |
|---|---|
| Red | 7000 |
| Yellow | 6000 |
| Green | 5500 |
| Blue | 5000 |
| Violet | 4000 |

These five slides can be variously combined in pairs to produce orange, lemon, turquoise, indigo, purple, magenta, and scarlet giving twelve separate spectral colors for use in the treatment of diseases. As it is absolutely essential that the vibration frequencies transmitted by the respective color wave slides be in their correct spectral relation, and that when combined, the spectral position of the resultant color wave be also true, it is necessary that these color wave slides be carefully tested in the laboratory. To prevent unauthorized persons from tampering with these color wave slides and to detect such occurrences, the hole 86 in screws 82 are provided for attachment of a wire and seal, although any other manner of sealing may be used if desired. In the event of damage to one or more color wave slides it is necessary to detach the color wave slide carrier as a unit by removing the attaching screws, and return it to the laboratory for insertion of properly attuned and tested color wave slides.

In Figs. 2 and 12, I have disclosed a blower type of electric fan but it is within the scope of my invention to utilize a suction type of fan to cool the interior of the cabinet.

Although the invention has been described in considerable detail, such description is intended as illustrative rather than limiting, as numerous embodiments will be apparent to those skilled in the art.

I claim:—

1. In a color wave projection apparatus, a double-walled louvred cabinet comprising an outer shell, an inner shell, and intercommunicating spaces therebetween, a non-inflammable heat insulating inner lining within said inner shell, and an electric fan comprising a motor and blades, aligned bores in parallel walls of the outer and inner shells for supporting said motor, said fan being adapted to force air into said cabinet via perforations in the sides and out through openings in the rear, and said fan motor being carried by and between said inner and outer shells with said blades revolvable within said cabinet.

2. A color wave projection apparatus comprising a double-walled light-proof cabinet, said cabinet including an outer shell and an inner shell, and intercommunicating spaces therebetween, a high-intensity source of white light within said cabinet, intercommunicable ventilating apertures in the walls of said cabinet, an air circulating fan, alinged openings in parallel walls of the outer and inner shells for supporting said fan, said fan supported within said cabinet and capable of drawing air into the cabinet over the light source and out of said cabinet via the said apertures, a condensing lens system within a through aperture in said cabinet, a color wave slide carrier with cooperating and interchangeable color wave slides adapted to be placed in the path of the radiant beam, means for directing the color waves, and means for controlling the fan and radiant light source.

3. In a condensing lens system, a disc lens and a lens frame adapted to support said lens, said frame having an aperture greater in area than said lens and provided with suitable bearing points rigidly to hold said lens and means to blow air over said disc lens, the air blown from said means having passage through said area of said frame which is greater than the area of the lens.

4. In a condensing lens system, a disc lens and a lens frame having a square aperture larger in area than the lens and being adapted to support said lens, said lens and frame being adapted to permit air to be blown over both faces of said lens by means of the spaces between the lens edge and the corners of said frame aperture, said air passing freely from one side of the lens to the other through said spaces.

5. In combination, a color-wave projection machine having a double-walled cabinet including an outer shell and an inner shell, intercommunicating spaces between said shells on both sides, top and front, an air-circulating fan located on one side of the cabinet, said outer shell having a row of perforations at the top and the bottom of each side, a front aperture for radiant emission, said rear wall provided with a movable cover, said inner shell having front and rear apertures, and perforations in the side containing said fan, a condensing lens system comprising a substantially disc lens and a lens frame having a square aperture larger in area than the lens and being adapted to support said lens, said lens and frame being adapted to permit air to be blown over both faces of said lens by virtue of the spaces between the lens edge and the corners of said frame aperture, said air passing freely from one side of the lens to the other side through said spaces.

6. A color-wave projection apparatus comprising a double-walled light-proof cabinet, a source of illumination within said cabinet, ventilating apertures in the walls of said cabinet, an air circulating fan mounted interiorly of said cabinet and capable of forcing air into the cabinet by way of said apertures, a condensing lens system within a through aperture in said cabinet, said lens system including a plurality of sets of a disc lens and its complemental holding frame in alignment, each frame having an aperture greater in area than said lens and provided with suitable bearing points to hold said lens rigidly.

7. A color-wave projection apparatus comprising a double-walled light-proof cabinet, a source of illumination within said cabinet, ventilating apertures in the walls of said cabinet, an air circulating fan mounted interiorly of said cabinet and capable of forcing air into the cabinet by way of said apertures, a condensing lens system within a through aperture in said cabinet, said lens system including a plurality of sets of a disc lens and its complemental holding frame in alignment, each frame having an aperture greater in area than said lens and provided with suitable bearing points to hold said lens rigidly, a color-wave slide carrier including a flat rectangular plate having an opening therein which is in alignment with said through aperture, and a flanged slide carrier, a plurality of color-wave slides retained in said color-wave slide carrier whereby the color-wave slides may be aligned with said through aperture in order to project separate spectral colors.

8. A color-wave projection machine, comprising inner and outer walled cabinet, said inner cabinet containing a lamp and an air circulating fan, condensing lenses mounted in alignment on parallel walls of said inner and outer walled cabinet, said fan adapted to move air over both surfaces of the condensing lenses and said lamp, a frame for each of the condensing lenses having an area greater than the area of each of the condensing lenses and provided with suitable bearing points for rigidly holding each of said lenses.

DINSHAH P. GHADIALI.